(12) United States Patent
Kim

(10) Patent No.: US 8,446,104 B2
(45) Date of Patent: May 21, 2013

(54) POWER SUPPLY DEVICE HAVING CURRENT CONTROL CIRCUIT CAPABLE OF CORRECTING POWER FACTOR

(75) Inventor: Soo Ryeol Kim, Seoul (KR)

(73) Assignee: Lumigreen Co., Ltd., Sungman-Si (KR)

( * ) Notice: Subject to any disclaimer, the term of this patent is extended or adjusted under 35 U.S.C. 154(b) by 217 days.

(21) Appl. No.: 13/079,427

(22) Filed: Apr. 4, 2011

(65) Prior Publication Data

US 2011/0260639 A1 Oct. 27, 2011

(30) Foreign Application Priority Data

Apr. 22, 2010 (KR) .................. 10-2010-0037183

(51) Int. Cl.
*G05F 1/00* (2006.01)
*H05B 37/02* (2006.01)
*H05B 39/04* (2006.01)
*H05B 41/36* (2006.01)

(52) U.S. Cl.
USPC ............ 315/294; 315/291; 315/302; 315/307

(58) Field of Classification Search
None
See application file for complete search history.

(56) References Cited

U.S. PATENT DOCUMENTS 6,218,785 B1* 4/2001 Incerti .................. 315/185 S
2011/0285319 A1* 11/2011 Chao et al. ................ 315/297

* cited by examiner

*Primary Examiner* — Anh Tran
(74) *Attorney, Agent, or Firm* — Birch, Stewart, Kolasch & Birch, LLP

(57) ABSTRACT

Disclosed herein is a power supply device capable of correcting power factor. The power supply device includes a rectification circuit, a first constant current circuit, a capacitor, and a second constant current circuit. The rectification circuit rectifies input Alternating Current (AC) voltage. The first constant current circuit is connected in series to a load. The capacitor is connected in parallel to the first constant current circuit and the load that are connected in series to each other. The second constant current circuit is disposed between the output of the rectification circuit and the capacitor.

4 Claims, 5 Drawing Sheets

POWER SUPPLY DEVICE HAVING CURRENT CONTROL CIRCUIT CAPABLE OF CORRECTING POWER FACTOR

BACKGROUND OF THE INVENTION

1. Field of the Invention

The present invention relates to a circuit that is capable of correcting a power factor in a small-sized power supply device for a Light-Emitting Diode (LED) lamp, a compact fluorescent lamp or a small-sized adapter.

2. Description of the Related Art

Since an LED lamp, a compact fluorescent lamp and a small-sized adaptor are small in size, small-sized power supply devices are used therein. A conventional power supply device is configured as shown in FIG. 1, so that AC current is supplied to a bridge diode circuit and then forms pulsating current, and the pulsating current is brought into approximation with DC current by an electrolytic capacitor and is then supplied to load.

Meanwhile, since the conventional technology simply uses an electrolytic capacitor, charging rapidly starts near the peak value of input voltage and then discharging is rapidly performed, as shown in the second graph of FIG. 3. Therefore, the time period over which input current flows is short, so that the input current flows only during a part of the interval of the waveform of the input voltage, with the result that the power factor decreases and therefore a loss occurs on a transmission line that supplies power.

In order to mitigate this problem, a power supply device having a Power Factor Correction (PFC) circuit should be applied. However, an LED lamp, a compact fluorescent lamp and a small-sized adaptor have internal spaces that are too small to accommodate such a circuit, and also an increase in cost occurs due to the addition of such a PFC circuit. Thus, it is difficult to manufacture a power supply device, to which a PFC circuit has been applied, at low cost and in small size, and therefore such a PFC circuit is not applied in many cases, thereby resulting in energy being wasted.

Meanwhile, such PFC circuits may be classified into active PFC circuits and passive PFC circuits. A representative passive PFC circuit uses a resonance circuit (LC) method in which an inductor L corresponding to an electrolytic capacitor C is used, as shown in FIG. 2. In this method, the power factor is improved by the inductor which compensates for the phase difference generated by the capacitor, compared to that shown in the second graph of FIG. 3, as shown in the third graph of FIG. 3 (that is, the phase lead generated by the capacitor is compensated for by the phase lead of the inductor). This passive method can normally improve the power factor up to 0.8.

However, since AC current has a low frequency in a range of 50 Hz to 60 Hz and a low frequency inductor is large and heavy, it is difficult to apply such a passive PFC circuit to a small-sized power supply device.

Furthermore, although an active PFC circuit can achieve a high power factor using a switching method, it has the disadvantages of being expensive because of the complication of the circuit thereof and requiring a countermeasure for EMI due to the generation of harmonics resulting from switching. Accordingly, it is difficult to apply such an active PFC circuit to a small-sized power supply device having a small internal space and requiring low cost manufacturing.

SUMMARY OF THE INVENTION

Accordingly, the present invention has been made keeping in mind the above problems occurring in the prior art, and an object of the present invention is to provide a PFC circuit that has a small size, that can be manufactured at low cost, and that can achieve a high power factor.

In order to accomplish the above object, the present invention provides a power supply device capable of correcting a power factor, including a rectification circuit for rectifying input AC voltage; a first constant current circuit connected in series to a load; a capacitor connected in parallel to the first constant current circuit and the load that are connected in series to each other; and a second constant current circuit disposed between the output of the rectification circuit and the capacitor.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
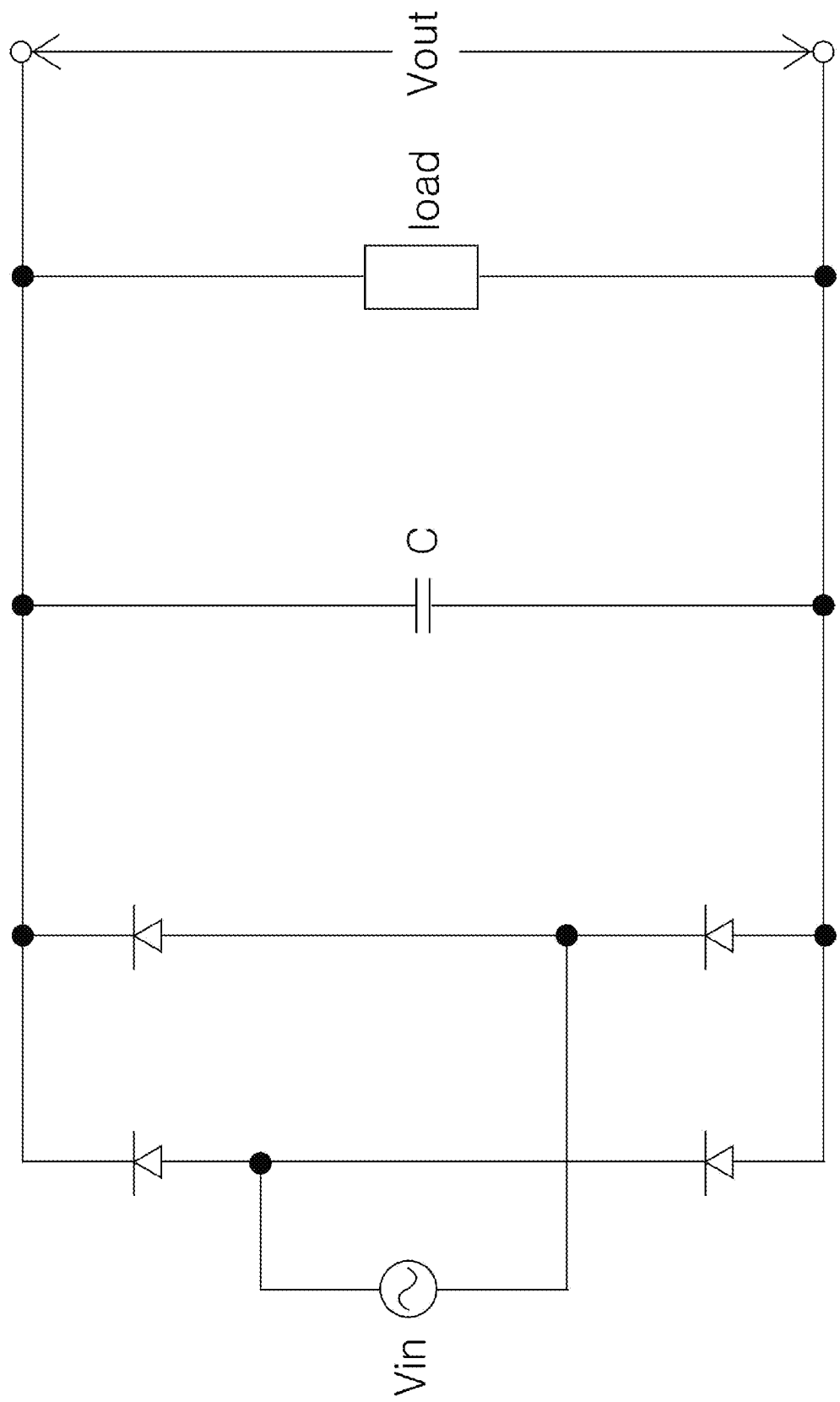
FIG. 1 shows a conventional power supply device.
Figure 2:
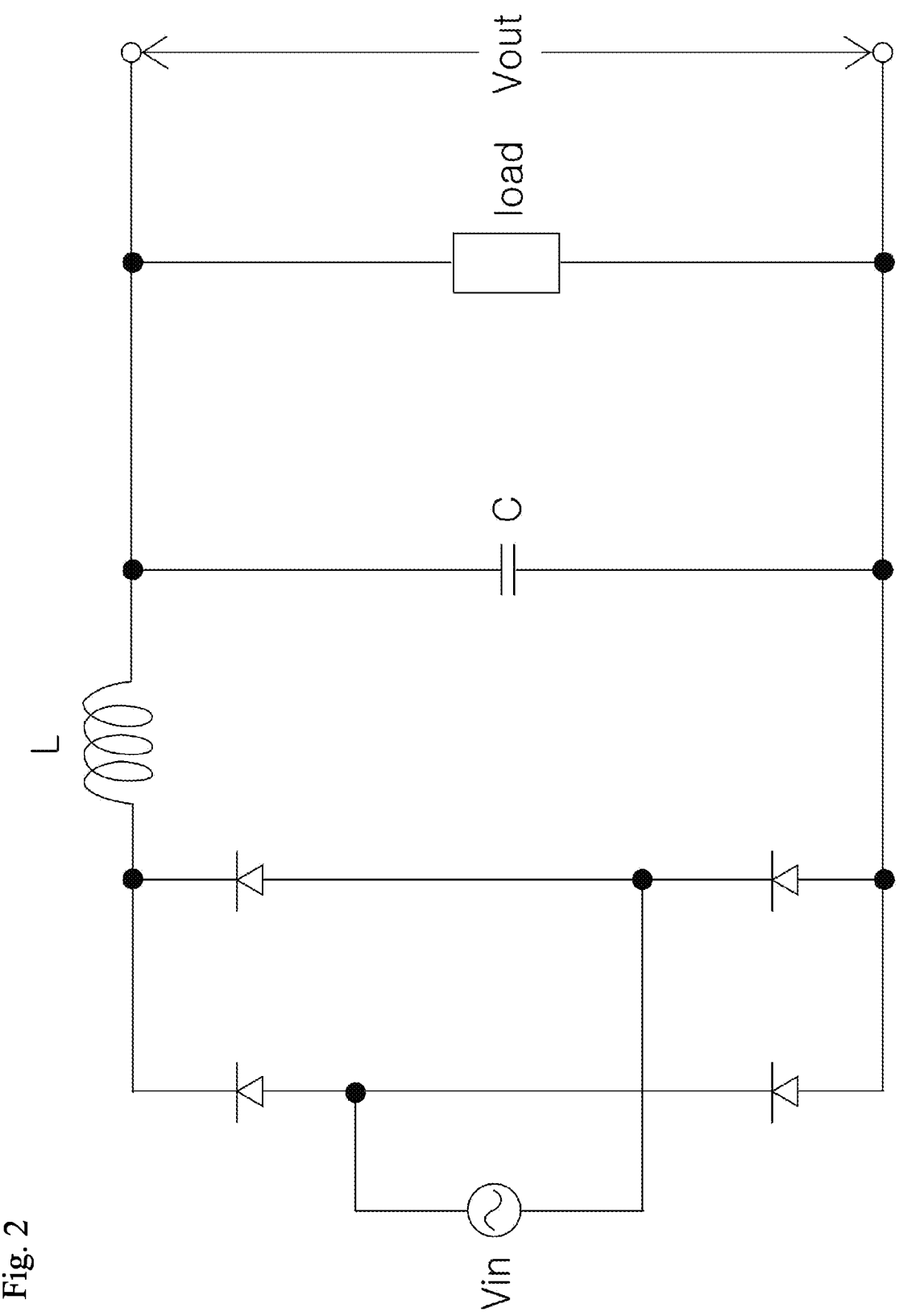
FIG. 2 shows a conventional resonance circuit (LC)-type PFC circuit in which an inductor corresponding to an electrolytic capacitor has been applied.

Reference now should be made to the drawings, throughout which the same reference numerals are used to designate the same or similar components.

The present invention will be described in greater detail below with reference to the accompanying drawings.

Figure 4:
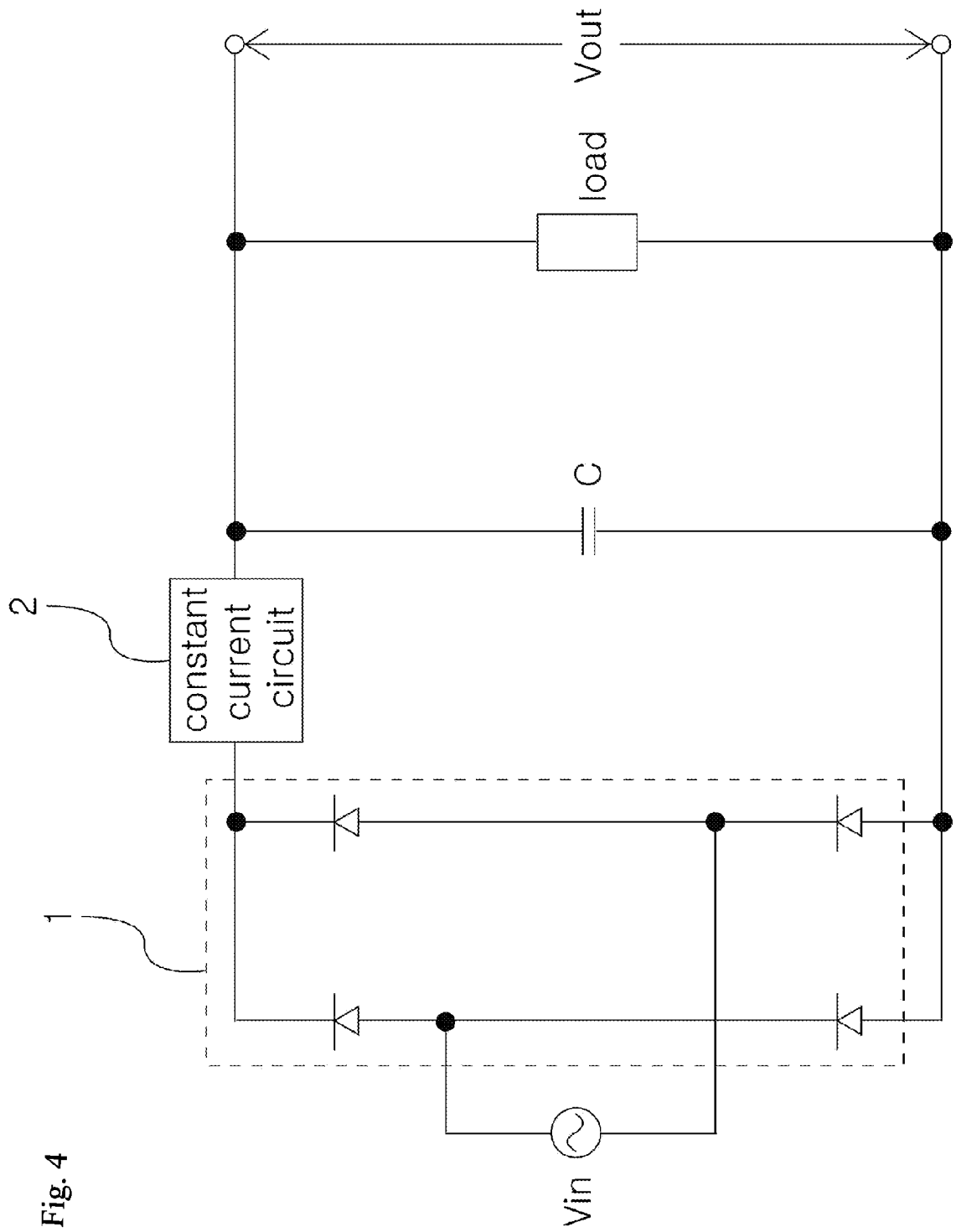
FIG. 4 shows a power supply device according to a first embodiment of the present invention.

In the present invention, AC power is rectified by a bridge diode circuit 1 in the form of pulsating current and a constant current circuit 2 is used instead of an existing inductor having a large volume and a heavy weight, as shown in FIG. 4.

Constant current is always output from the constant current circuit 2. Accordingly, unlike in the conventional technology in which the constant current circuit 2 is not present, rapid charging and discharging current flows and therefore input current abruptly changes (see the second graph of FIG. 3), a capacitor C is gradually charged and therefore input voltage having a phase almost identical to that of input current flows, as shown in the fourth graph of FIG. 3 (refer to the first embodiment graph of the present invention), so that the power factor is increased to a value equal to or higher than 0.9.

That is, this constant current circuit 2 increases the time required to charge the capacitor C, and therefore the phase of the current of an AC input terminal is matched to that of the voltage thereof, so that the invalid power portion is reduced, thereby improving the power factor.

In this case, since the output of the constant current circuit 2 is constant, the constant current is divided and then flows through a load LED and a capacitor C.

In particular, since a current control circuit such as the constant current circuit 2 is manufactured in one-chip form, it is inexpensive and small in volume, so that it can be applied to small-sized, low-cost power supply devices such as those of an adaptor, an LED lamp and a compact fluorescent lamp, with the result that a high power factor is achieved, thereby increasing the effect of saving energy.

Next, another embodiment of the present invention having an improved power factor compared to that of FIG. 4 will be described with reference to FIG. 5.

Figure 5:
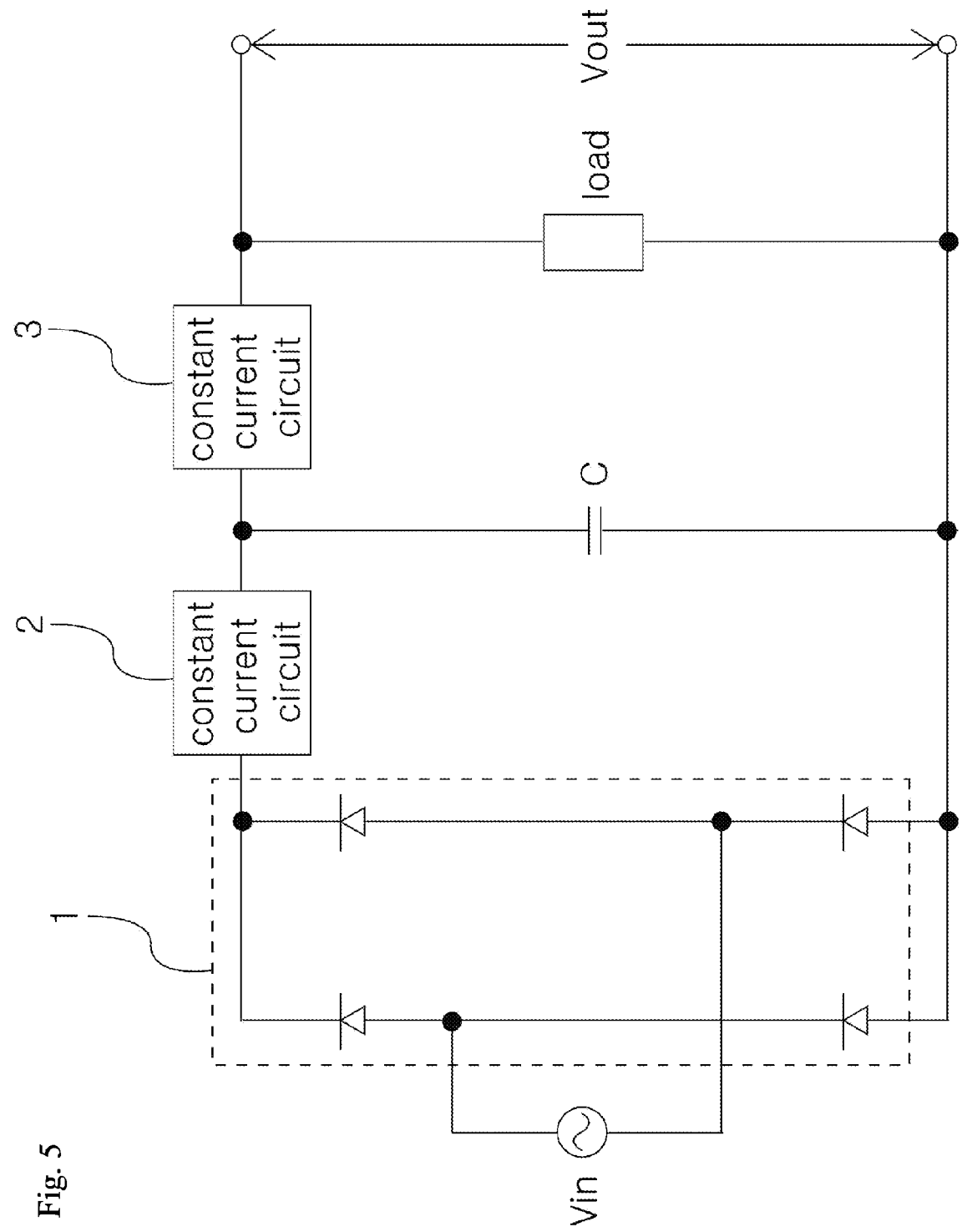
FIG. 5 shows a power supply device according to a second embodiment of the present invention.

FIG. 5 is different from FIG. 4 in that a constant current circuit 3 has been added ahead of the load.

Figure 3:
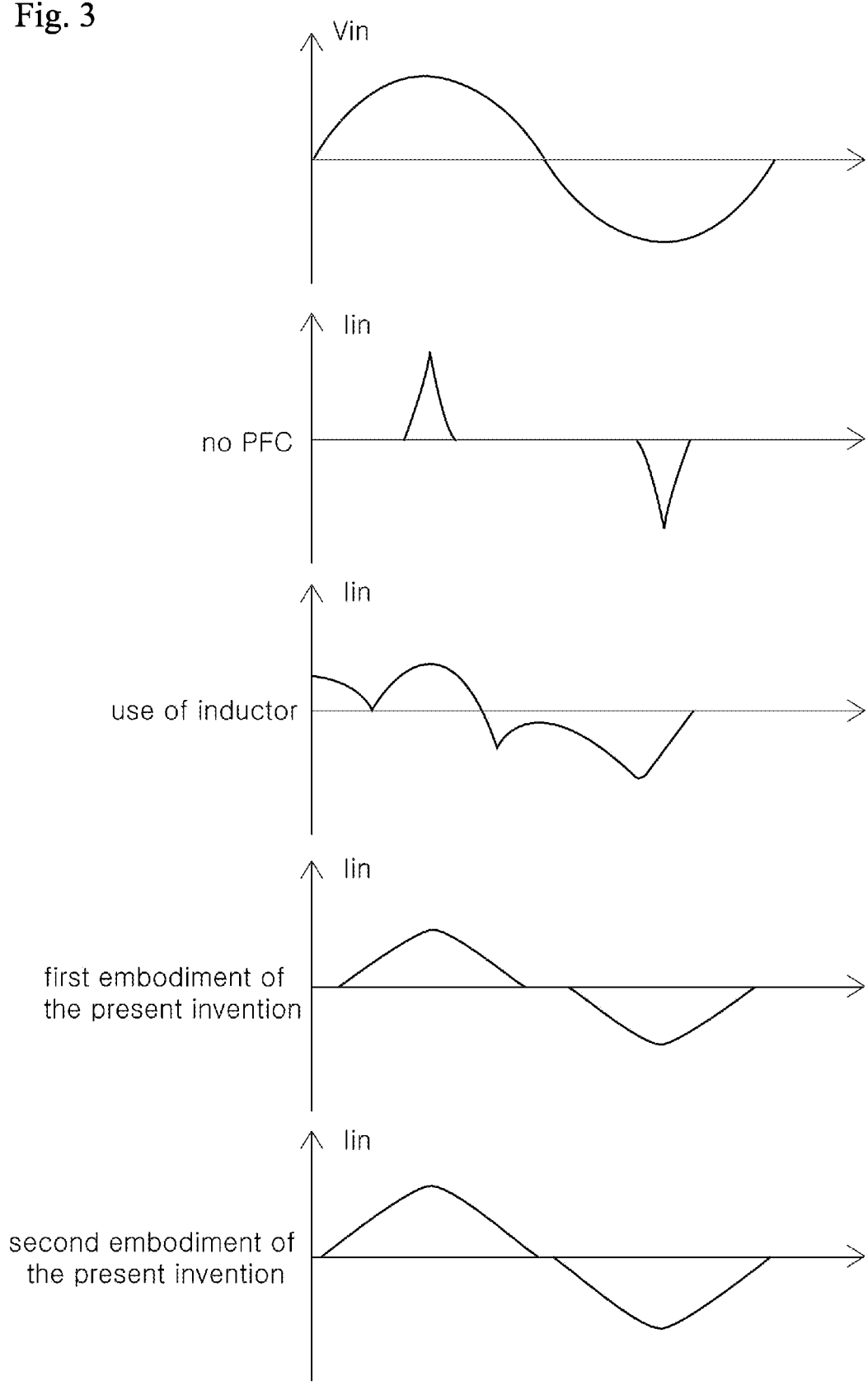
FIG. 3 showing the waveforms of input current according to the conventional technology and the present invention.

In FIG. 4, the entire current is made constant by a constant current circuit 2, and therefore current is prevented from rapidly flowing to a capacitor C, so the capacitor C is gradually charged with the current, with the result that input current is as shown in the fourth graph of FIG. 3.

However, in FIG. 5, rapid current is prevented from flowing through the capacitor C, and furthermore the time required to discharge the capacitor C as well as the time required to charge the capacitor C is further increased, so that input current is made to flow as shown in the fifth graph of FIG. 3 (the graph of the second embodiment of the present invention). Accordingly, the input current becomes almost completely the same phase as the input voltage, and therefore the power factor is increased to a value equal to or higher than 0.9.

That is, the output current of the constant current circuit 2 and the output current of the constant current circuit 3 are constant. Accordingly, for example, when the output current of the constant current circuit 2 is 25 mA and the output current of the constant current circuit 3 is 20 mA, a constant current of 5 mA (=25-20 mA) always flows through the capacitor C, so that charging and discharging are performed very gradually. As shown in the fifth graph of FIG. 3, input current flows more gradually, so that input voltage has the same phase as the input current, thereby further improving the power factor.

Meanwhile, although the preferred embodiment of the present invention has been described, it should be noted that the present invention is not limited to the embodiment but various modifications are possible within the range which does not depart from the spirit of the present invention.

That is, although the constant current circuit has been described as being used to limit excessively fast charging and discharging current, one of a variety of current control circuits capable of achieving the principle of the present invention, which is to gradually charge and discharge the capacitor, can be employed.

For example, when a current limiting resistor R is used instead of the constant current circuit 2, as shown in FIG. 5, the charging time is increased by the limitation of the charging current of the resistor R and the discharging time is increased by the constant current circuit 3, thereby achieving a power factor correction effect, as shown in FIG. 5.

In accordance with the present invention, there is provided a PFC circuit that is suitable for use in an LED lamp, a compact fluorescent lamp or a small-sized adaptor, that is small in size, is inexpensive, and can achieve a high power factor.

What is claimed is:

1. A power supply device capable of correcting a power factor, comprising:
   a rectification circuit for rectifying input Alternating Current (AC) voltage;
   a first constant current circuit connected in series to a load;
   a capacitor connected in parallel to the first constant current circuit and the load that are connected in series to each other; and
   a second constant current circuit disposed between output of the rectification circuit and the capacitor.

2. The power supply device as set forth in claim 1, wherein the load is one or more Light-Emitting Diode (LED) devices.

3. A power supply device capable of correcting a power factor, comprising:
   a rectification circuit for rectifying input AC voltage;
   a first constant current circuit connected in series to a load;
   a capacitor connected in parallel to the first constant current circuit and the load that are connected in series to each other; and
   a resistor disposed between output of the rectification circuit and the capacitor.

4. The power supply device as set forth in claim 3, wherein the load is one or more LED devices.

* * * * *